United States Patent [19]

Davis

[11] Patent Number: 5,636,466

[45] Date of Patent: Jun. 10, 1997

[54] ANIMAL DECOY APPARATUS

[76] Inventor: Brian Davis, 7187 Happy Valley Rd., Kuna, Id. 83634

[21] Appl. No.: 509,451

[22] Filed: Jul. 31, 1995

[51] Int. Cl.$^6$ .................................................. A01M 31/06
[52] U.S. Cl. ................................................................ 43/3
[58] Field of Search ............................................. 43/2, 3

[56]  References Cited

U.S. PATENT DOCUMENTS

| | | | |
|---|---|---|---|
| 3,689,927 | 9/1972 | Boston | 43/3 |
| 3,916,553 | 11/1975 | Lynch | 43/3 |
| 4,128,958 | 12/1978 | Snow | 43/3 |
| 4,172,335 | 10/1979 | Farmer . | |
| 4,322,908 | 4/1982 | McCrory | 43/3 |
| 4,611,421 | 9/1986 | Jacob . | |
| 4,753,028 | 6/1988 | Farmer . | |
| 4,885,861 | 12/1989 | Gazalski . | |
| 4,928,418 | 5/1990 | Stelly . | |
| 5,036,614 | 8/1991 | Jackson | 43/3 |
| 5,168,649 | 12/1992 | Wright | 43/3 |
| 5,172,506 | 12/1992 | Tiley et al. . | |
| 5,231,780 | 8/1993 | Gazalski | 43/3 |
| 5,233,780 | 8/1993 | Overholt | 43/2 |
| 5,289,654 | 3/1994 | Denny | 43/2 |
| 5,377,439 | 1/1995 | Roos | 43/3 |
| 5,459,958 | 10/1995 | Remke | 43/2 |

*Primary Examiner*—Kurt Rowan

[57]  ABSTRACT

An animal decoy apparatus includes a housing assembly which simulates an animal body. A leg assembly is partially housed within the housing assembly and partially extends outside of the housing assembly. A leg retraction and extension assembly is housed within the housing assembly and is connected between the housing assembly and the leg assembly. A leg-controlling wave receiver assembly is housed with the housing assembly and is connected to the leg retraction and extension assembly. The leg-controlling wave receiver assembly controls the leg retraction and extension assembly. A manually operated wave transmitter assembly is located outside of the housing assembly. The wave transmitter assembly transmits a control signal that is received by the leg-controlling wave receiver assembly. The housing assembly simulates a body of a water fowl. A pair of upper appendages are connected to the housing assembly. The upper appendages extend outward from the housing assembly. An upper appendage flapping assembly is housed within the housing assembly and is connected between the housing assembly and the upper appendages. An appendage-controlling wave receiver assembly is housed within the housing assembly and is connected to the upper appendage flapping assembly. The appendage-controlling wave receiver assembly controls the upper appendage flapping assembly. The appendage-controlling wave receiver assembly is controlled by the wave transmitter assembly. The upper appendages simulate wings on a water fowl.

7 Claims, 3 Drawing Sheets

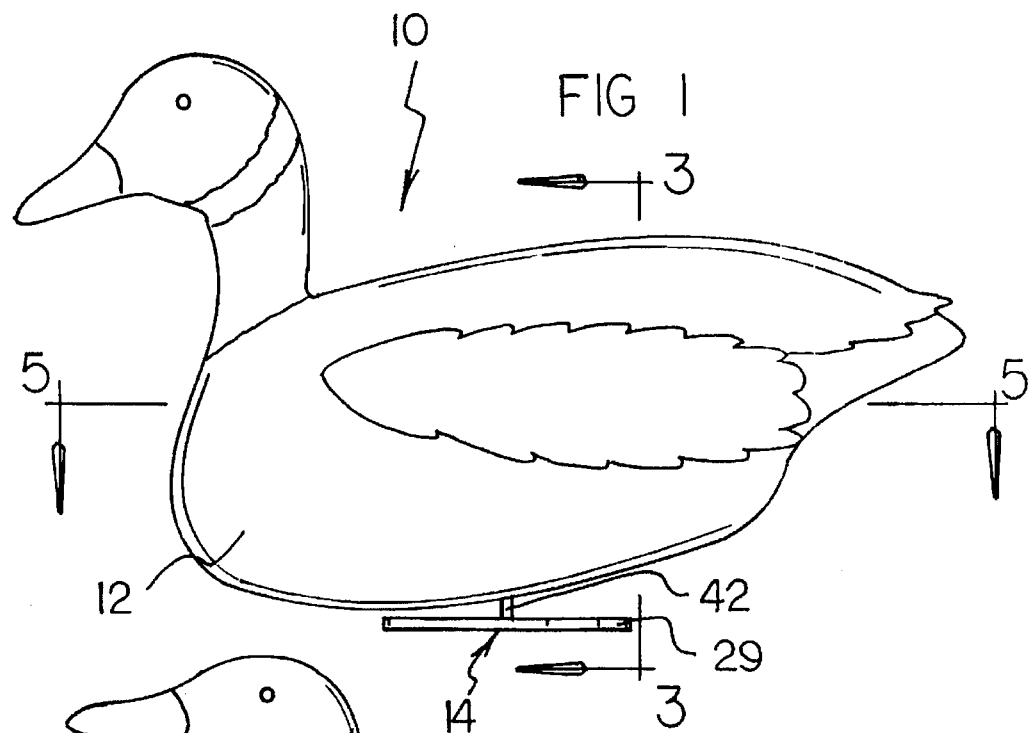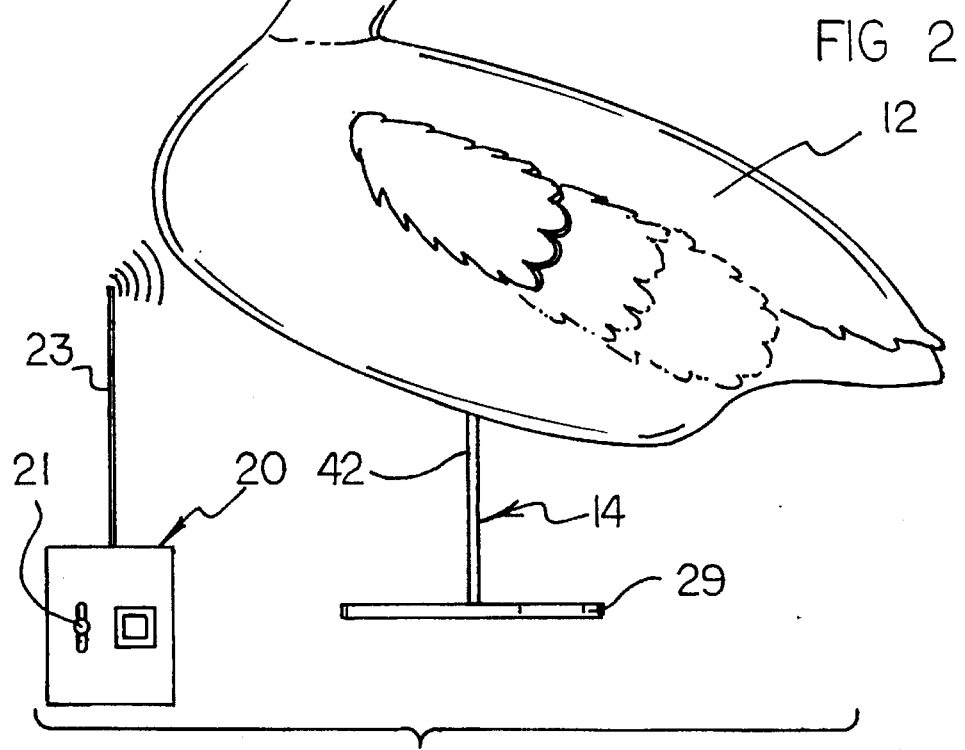

ANIMAL DECOY APPARATUS

BACKGROUND OF THE INVENTION

1. Field of the Invention

The present invention relates generally to devices for attracting game animals and, more particularly, to decoy devices especially adapted for attracting game animals.

2. Description of the Prior Art

When hunting animals, hunters often employ devices whose function is to attract the animals being hunted. For example, audible duck and geese callers are employed. Animal-attracting scents are sometime employed. Bait is sometimes employed. In addition, animal-like decoys are also often employed.

Most decoys are immobile objects which give a visual appearance of an animal. However, such immobile objects are unrealistic in the sense that real animals are not immobile. Real animals move around. In this respect, it would be desirable for an animal decoy to move, rather than be immobile.

Of special interest are decoys which simulate water fowl, such as ducks and geese. In the prior art, water fowl decoys are known which have wings that are mechanically flapped by pulling a string. Limitations imposed by a string include distance from the decoy to the person pulling the string and the likelihood of the string being tangled in foliage or undergrowth. In this respect, it would be desirable for a water fowl decoy to have wings that flap without using a pull string.

In addition, water fowl decoys are known in the prior art which have wings that are flapped by battery power. Such decoys do not use a string. It is noted, however, that the mere flapping of wings is somewhat less than a realistic action for water fowl. More specifically, water fowl often rise up on their legs when they flap their wings. In this respect, it would be desirable for a water fowl decoy to rise up on its legs, in addition to flapping its wings.

Throughout the years, a number of innovations have been developed relating to water fowl decoys, and the following U.S. patents are representative of some of those innovations: U.S. Pat. Nos. 4,172,335; 4,611,421; 4,753,028; 4,885,861; 4,928,418; and 5,172,506. More specifically, U.S. Pat. No. 4,172,335 discloses a goose decoy that has no wings and is immobile when used. U.S. Pat. No. 4,885,861 discloses a goose decoy that has legs which the decoy stands upon. However, the legs are static; they do not rise or fall. For a more realistic decoy, it would be desirable if a water fowl decoy can rise and fall on legs.

U.S. Pat. Nos. 4,611,421, 4,753,028, 4,928,418, and 5,172,506 disclose water fowl decoys having bodies that expand or contract, such as in response to the wind. The expansion and contraction provides some motion for the decoys. It is well known that the wind can not be relied upon for consistency. Therefore, motion of the decoy can be completely absent if the wind is too low. In this respect, it would be desirable for a water fowl decoy has motion which does not depend upon the wind.

Still other features would be desirable in an animal decoy apparatus. Rather than an animal decoy apparatus being controlled by unpredictable wind, it would be desirable for an animal decoy apparatus to be remotely controlled by a human operator. In a number of devices that are remote controlled, electromagnetic waves are employed for sending and receiving remote control signals. In this respect, it would be desirable for an animal decoy to employ electromagnetic waves for sending and receiving remote control signals.

Thus, while the foregoing body of prior art indicates it to be well known to use animal decoys for hunters, the prior art described above does not teach or suggest an animal decoy apparatus which has the following combination of desirable features: (1) moves rather than being immobile; (2) has wings that flap without using a pull string; (3) rises and falls on legs; (4) has motion which does not depend upon the wind; (5) is remotely controlled by a human operator; and (6) employs electromagnetic waves for sending and receiving remote control signals. The foregoing desired characteristics are provided by the unique animal decoy apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an animal decoy apparatus which includes a housing assembly which simulates an animal body. A leg assembly is partially housed within the housing assembly and partially extends outside of the housing assembly. A leg retraction and extension assembly is housed within the housing assembly and is connected between the housing assembly and the leg assembly. A leg-controlling wave receiver assembly is housed with the housing assembly and is connected to the leg retraction and extension assembly. The leg-controlling wave receiver assembly controls the leg retraction and extension assembly.

A manually operated wave transmitter assembly is located outside of the housing assembly. The wave transmitter assembly transmits a control signal that is received by the leg-controlling wave receiver assembly.

The leg retraction and extension assembly includes a motorized winch assembly supported by a portion of the leg assembly. A cord is connected to the winch assembly, wherein a free end of the cord is connected to the housing assembly. The winch assembly includes a motor and a winding drum rotated by the motor. The leg assembly includes an upper mounting portion for mounting the winch assembly and the leg-controlling wave receiver assembly. A pair of limbs extend downward from the upper mounting portion and extend through a pair of apertures in the housing assembly. A foot portion is located outside the housing assembly is connected to ends of the limbs. The housing assembly simulates a body of a water fowl.

A pair of upper appendages that are connected to the housing assembly. The upper appendages extend outward from the housing assembly. An upper appendage flapping assembly is housed within the housing assembly and is connected between the housing assembly and the upper appendages. An appendage-controlling wave receiver assembly is housed within the housing assembly and is connected to the upper appendage flapping assembly. The appendage-controlling wave receiver assembly controls the upper appendage flapping assembly. The appendage-controlling wave receiver assembly is controlled by the wave transmitter assembly.

The upper appendage flapping assembly includes a motor attached to the housing assembly. A push-pull wheel is connected to the motor. A pair of push-pull rods are connected to the push-pull wheel, wherein distal ends of the push-pull rods are connected to the upper appendages. The upper appendages are connected at their proximal ends to the housing assembly by hinges. The push-pull rods are connected to the upper appendages by pivots at positions distal to the hinges and to the proximal ends of the upper appendages. The upper appendages simulate wings on a water fowl.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved animal decoy apparatus which has all of the advantages of the prior art and none of the disadvantages.

It is another object of the present invention to provide a new and improved animal decoy apparatus which may be easily and efficiently manufactured and marketed.

It is a further object of the present invention to provide a new and improved animal decoy apparatus which is of durable and reliable construction.

An even further object of the present invention is to provide a new and improved animal decoy apparatus which is susceptible of a low cost of manufacture with regard to both materials and labor, and which accordingly is then susceptible of low prices of sale to the consuming public, thereby making such animal decoy apparatus available to the buying public.

Still yet a further object of the present invention is to provide a new and improved animal decoy apparatus which moves rather than being immobile.

Still another object of the present invention is to provide a new and improved animal decoy apparatus that has wings that flap without using a pull string.

Even another object of the present invention is to provide a new and improved animal decoy apparatus that rises and falls on legs.

Still a further object of the present invention is to provide a new and improved animal decoy apparatus which has motion which does not depend upon the wind.

Yet another object of the present invention is to provide a new and improved animal decoy apparatus that is remotely controlled by a human operator.

Still another object of the present invention is to provide a new and improved animal decoy apparatus which employs electromagnetic waves for sending and receiving remote control signals.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a preferred embodiment of the animal decoy apparatus of the invention in a lowered position with its legs retracted and its wings stationary.

FIG. 2 is a side view of the embodiment of the animal decoy apparatus shown in FIG. 1 in a raised position with its legs extended and its wings flapping.

DESCRIPTION OF THE PREFERRED EMBODIMENT

Figure 3:
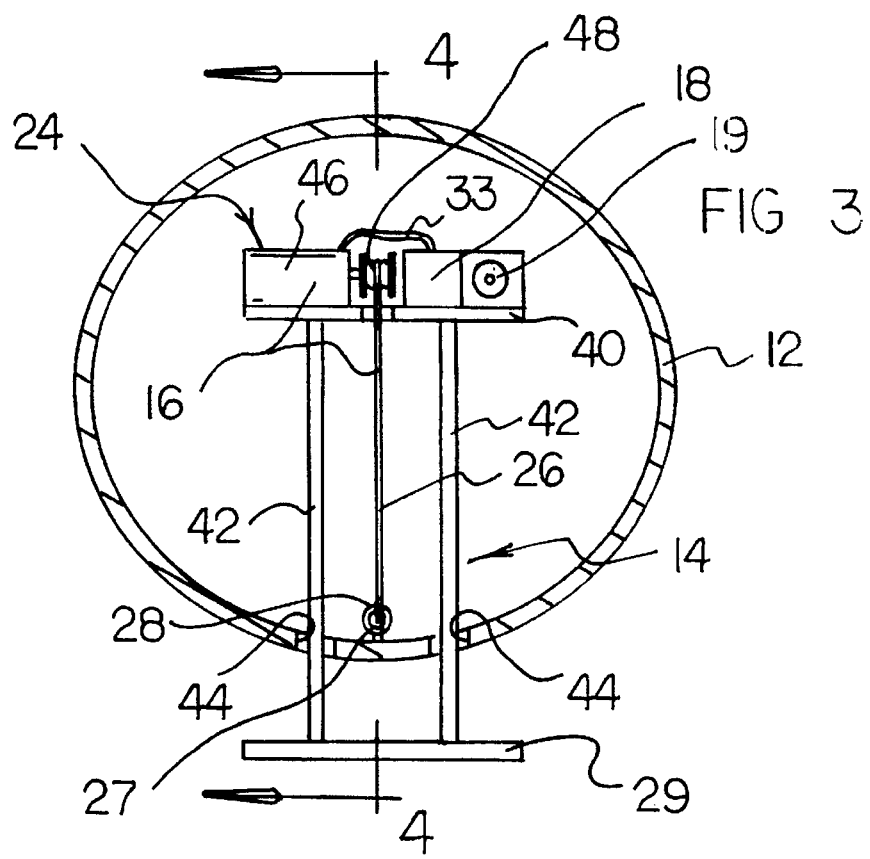
FIG. 3 is an enlarged cross-sectional view of the embodiment of the animal decoy apparatus of FIG. 1 taken along line 3—3 thereof with the wings left off of the drawing and with the legs retracted.

With reference to the drawings, a new and improved animal decoy apparatus embodying the principles and concepts of the present invention will be described.

Turning to FIGS. 1–6, there is shown an exemplary embodiment of the animal decoy apparatus of the invention generally designated by reference numeral 10. In its preferred form, animal decoy apparatus 10 includes a housing assembly 12 which simulates an animal body. A leg assembly 14 is partially housed within the housing assembly 12 and partially extends outside of the housing assembly 12. A leg retraction and extension assembly 16 is housed within the housing assembly 12 and is connected between the housing assembly 12 and the leg assembly 14. A leg-controlling wave receiver assembly 18 is housed with the housing assembly 12 and is connected to the leg retraction and extension assembly 16 by conductor assembly 33. The leg-controlling wave receiver assembly 18 controls the leg retraction and extension assembly 16.

A manually operated wave transmitter assembly 20 is located outside of the housing assembly 12. The wave transmitter assembly 20 transmits a control signal that is received by the leg-controlling wave receiver assembly 18. The leg-controlling wave receiver assembly 18 includes a receiving antenna 19.

The leg retraction and extension assembly 16 includes a motorized winch assembly 24 supported by a portion of the leg assembly 14. A cord 26 is connected to the winch assembly 24, wherein a free end 28 of the cord 26 is connected to the housing assembly 12 by an eyelet 27 attached to the housing assembly 12. The winch assembly 24 includes a motor 46 and a winding drum 48 rotated by the motor 46. The leg assembly 14 includes an upper mounting portion 40 for mounting the winch assembly 24 and the leg-controlling wave receiver assembly 18. A pair of limbs 42 extend downward from the upper mounting portion 40 and extend through a pair of apertures 44 in the housing assembly 12. A foot portion 29 is located outside the housing assembly 12 is connected to ends of the limbs 42. The housing assembly 12 simulates a body of a water fowl.

In operation of the leg assembly 14 of the animal decoy apparatus 10, the animal decoy apparatus 10 is first placed on a hard surface, such as the ground. The wave transmitter assembly 20 is manually operated by handle 21 so that electromagnetic waves are emitted from an antenna 23. The transmitted electromagnetic waves are picked up by the leg-controlling wave receiver assembly 18 inside the housing assembly 12. As a result, the leg-controlling wave receiver assembly 18 activates the winch assembly 24 causing the cord 26 to go through a cycle of being wound up onto the winding drum 48 of the winch assembly 24 and of being unwound from the winding drum 48 of the winch assembly 24. When the cord 26 is unwound from the winch assembly 24, the housing assembly 12 lowers under the influence of gravity towards a foot portion 29 of the leg assembly 14. When the housing assembly 12 reaches the bottommost position with respect to the foot portion 29 of the leg assembly 14, the body portion of the simulated animal appears to be resting directly on the ground, as shown in FIGS. 1 and 3.

Figure 4:
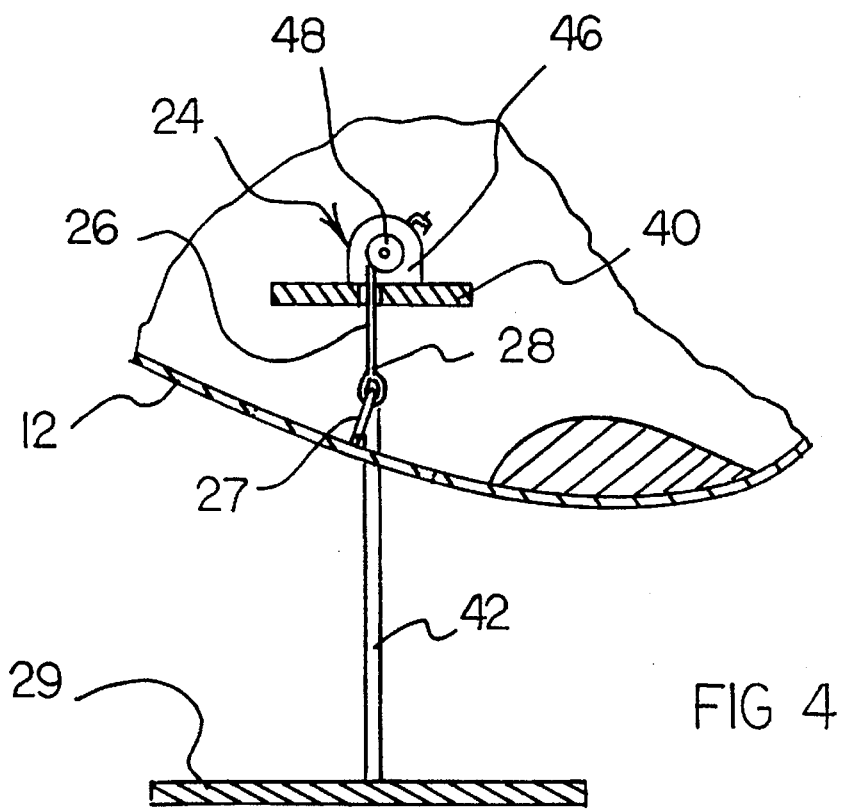
FIG. 4 is an enlarged partial cross-sectional view of the embodiment of the invention shown in FIG. 3 taken along line 4—4 thereof with the legs extended.

In contrast, when the winch assembly 24 reverses its direction of rotation, the cord 26 is wound up by the winch assembly 24 onto the winding drum 48. When this occurs, the winch assembly 24 pulls the housing assembly 12 away from the foot portion 29 of the leg assembly 14. When the housing assembly 12 reaches the topmost position with respect to the foot portion 29 of the leg assembly 14, the body portion of the simulated animal appears to be standing on its legs, as shown in FIGS. 2 and 4.

The leg-controlling wave receiver assembly 18 can control the operation of the winch assembly 24 in a preprogrammed manner. The animal decoy apparatus 10 can rise and fall continuously, or a predetermined number of rise and fall cycles can be carried out before the rise and fall cycles cease.

Figure 5:
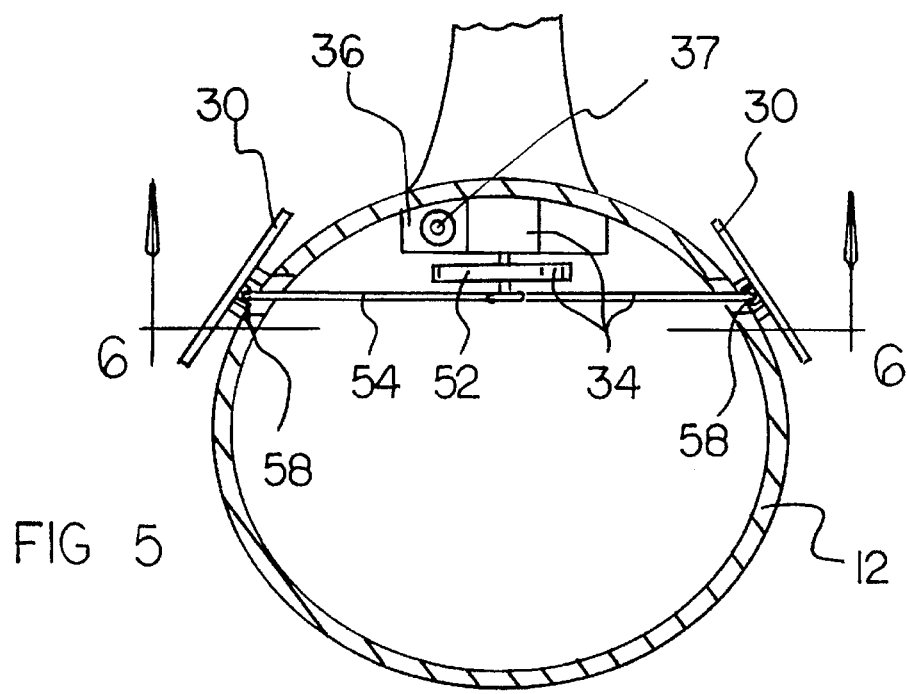
FIG. 5 is a partial cross-sectional view of the embodiment of the invention shown in FIG. 1 taken along line 5—5 thereof, showing flappable wings and a mechanism for flapping the wings.
Figure 6:
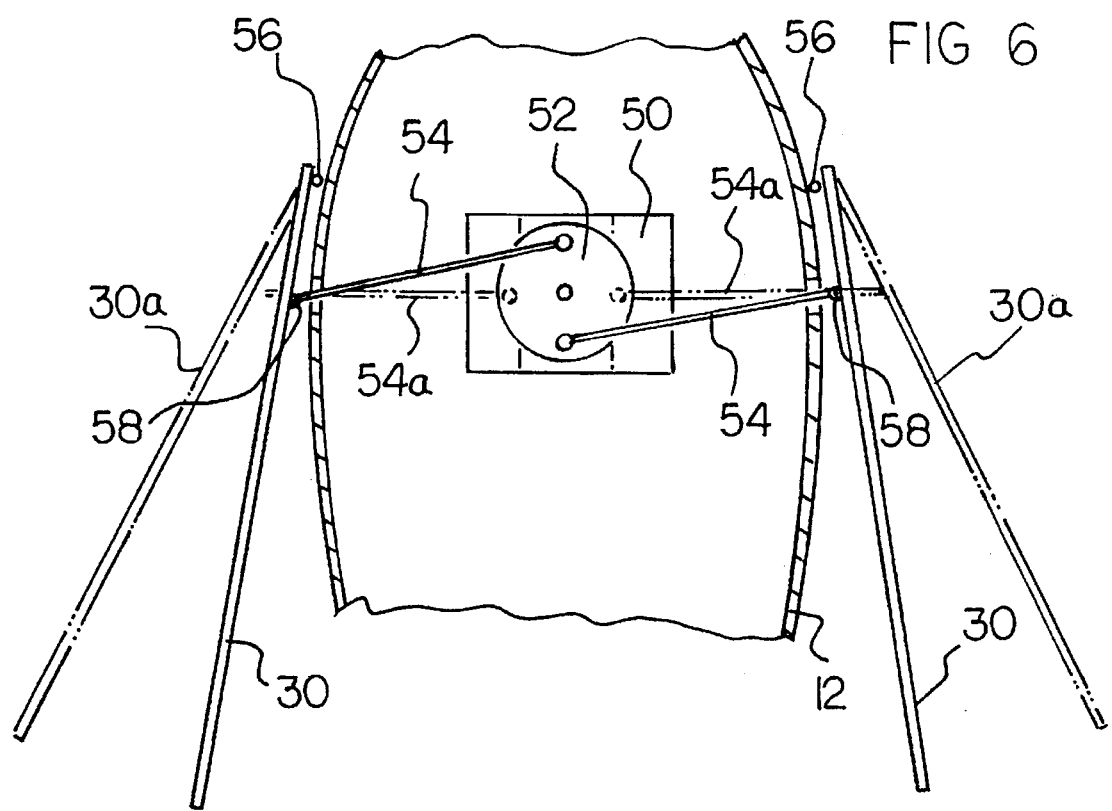
FIG. 6 is a cross-sectional view of the embodiment of the invention shown in FIG. 5 taken along line 6—6 thereof.

As shown in FIGS. 5 and 6, the animal decoy apparatus 10 of the invention also includes pair of upper appendages 30 that are connected to the housing assembly 12. The upper appendages 30 extend outward from the housing assembly 12. An upper appendage flapping assembly 34 is housed within the housing assembly 12 and is connected between the housing assembly 12 and the upper appendages 30. An appendage-controlling wave receiver assembly 36 is housed within the housing assembly 12 and is connected to the upper appendage flapping assembly 34. The appendage-controlling wave receiver assembly 36 controls the upper appendage flapping assembly 34. The appendage-controlling wave receiver assembly 36 is controlled by the wave transmitter assembly 20. The appendage-controlling wave receiver assembly 36 includes a receiving antenna 37.

The upper appendage flapping assembly 34 includes a motor 50 attached to the housing assembly 12. A push-pull wheel 52 is connected to the motor 50. A pair of push-pull rods 54 are connected to the push-pull wheel 52, wherein distal ends of the push-pull rods 54 are connected to the upper appendages 30.

The upper appendages 30 are connected at their proximal ends to the housing assembly 12 by hinges 56. The push-pull rods 54 are connected to the upper appendages 30 by pivots 58 at positions distal to the hinges 56 and to the proximal ends of the upper appendages 30. The upper appendages 30 simulate wings on a water fowl.

In operation of the upper appendages 30 of the animal decoy apparatus 10 of the invention, the handle 21 of the wave transmitter assembly 20 is manually operated, and the appendage-controlling wave receiver assembly 36 receives electromagnetic waves as control signals. The appendage-controlling wave receiver assembly 36 activates the motor 50 which turns the push-pull wheel 52 which pushes or pulls the push-pull rods 54. The push-pull rods 54 push or pull the upper appendages 30 so that the upper appendages 30 give the appearance of flapping wings.

In FIG. 6, the upper appendages 30, shown in solid lines, are adjacent to the housing assembly 12. In this position, the push-pull rods 54 are also shown in solid lines. In FIG. 6, the upper appendages 30a are shown in broken lines and are spaced away from the housing assembly 12. In this position, the push-pull rods 54a are also shown in broken lines. When the push-pull rods 54 push on the upper appendages 30, the upper appendages 30 flap away from the housing assembly 12. When the push-pull rods 54 pull on the upper appendages 30, the upper appendages 30 flap toward the housing assembly 12. When the upper appendages 30 flap back and forth, they pivot around the hinges 56.

It is noted that when the handle 21 of the wave transmitter assembly 20 operated, both the leg-controlling wave receiver assembly 18 and the appendage-controlling wave receiver assembly 36 are activated simultaneously. Therefore, both the leg raising and lowering and the upper appendage flapping are carried out simultaneously. In implementing the wave transmitter assembly 20, the leg-controlling wave receiver assembly 18, and the appendage-controlling wave receiver assembly 36, conventional remote-control units which employ electromagnetic waves can be employed. Such conventional remote-control units are used with remote-controlled airplanes, boats, and motor vehicles.

As described in detail above, the simulated animal can be a water fowl such as a duck or a goose. In this respect, the upper appendages 30 can be wings. Alternatively, other simulated animals can be employed. In this respect, the upper appendages 30 can be arms or forelegs instead of wings.

The components of the animal decoy apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved animal decoy apparatus that is low in cost, relatively simple in design and operation, and which may advantageously be used to move rather than being immobile. With the invention, an animal decoy apparatus is provided which has wings that flap without using a pull string. With the invention, an animal decoy apparatus is provided which rises and falls on legs. With the invention, an animal decoy apparatus is provided which has motion which does not depend upon the wind. With the invention, an animal decoy apparatus is provided which is remotely controlled by a human operator. With the invention, an animal decoy apparatus is provided which employs electromagnetic waves for sending and receiving remote control signals.

Thus, while the present invention has been shown in the drawings and fully descried above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An animal decoy apparatus, comprising:

a housing assembly which simulates an animal body, a leg assembly which is partially housed within said housing assembly and which partially extends outside of said housing assembly, a leg retraction and extension assembly housed within said housing assembly and connected between said housing assembly and said leg assembly, a leg-controlling wave receiver assembly housed with said housing assembly and connected to said leg retraction and extension assembly, wherein said leg-controlling wave receiver assembly controls said leg retraction and extension assembly, and a manually operated wave transmitter assembly located outside of said housing assembly, wherein said wave transmitter assembly transmits a control signal that is received by said leg-controlling wave receiver assembly, further including:

a pair of upper appendages connected to said housing assembly, extending outward from said housing assembly, an upper appendage flapping assembly housed within said housing assembly and connected between said housing assembly and said upper appendages, and an appendage-controlling wave receiver assembly housed with said housing assembly and connected to said upper appendage flapping assembly, wherein said appendage-controlling wave receiver assembly controls said upper appendage flapping assembly, wherein said appendage-controlling wave receiver assembly is controlled by said wave transmitter assembly, wherein said appendage flapping assembly includes:

a motor attached to said housing assembly, a push-pull wheel connected to said motor, a pair of push-pull rods connected to said push-pull wheel, wherein distal ends of said push-pull rods are connected to said upper appendages.

2. The apparatus of claim 1 wherein said leg retraction and extension assembly includes:

a motorized winch assembly supported by a portion of said leg assembly, and a cord connected to said winch assembly, wherein a free end of said cord is connected to said housing assembly.

3. The apparatus of claim 2 wherein said winch assembly includes a motor and a winding drum rotated by said motor.

4. The apparatus of claim 2 wherein said leg assembly includes:

an upper mounting portion for mounting said winch assembly and said leg-controlling wave receiver assembly, a pair of limbs extending downward from said upper mounting portion and extending through a pair of apertures in said housing assembly, and a foot portion, located outside said housing assembly, connected to ends of said limbs.

5. The apparatus of claim 1 wherein said housing assembly simulates a body of a water fowl.

6. The apparatus of claim 1 wherein said upper appendages simulate wings on a water fowl.

7. An animal decoy apparatus, comprising:

a housing assembly which simulates an animal body, a leg assembly which is partially housed within said housing assembly and which partially extends outside of said housing assembly, a leg retraction and extension assembly housed within said housing assembly and connected between said housing assembly and said leg assembly, a leg-controlling wave receiver assembly housed with said housing assembly and connected to said leg retraction and extension assembly, wherein said leg-controlling wave receiver assembly controls said leg retraction and extension assembly, and a manually operated wave transmitter assembly located outside of said housing assembly, wherein said wave transmitter assembly transmits a control signal that is received by said leg-controlling wave receiver assembly, further including:

a pair of upper appendages connected to said housing assembly, extending outward from said housing assembly, an upper appendage flapping assembly housed within said housing assembly and connected between said housing assembly and said upper appendages, and an appendage-controlling wave receiver assembly housed with said housing assembly and connected to said upper appendage flapping assembly, wherein said appendage-controlling wave receiver assembly controls said upper appendage flapping assembly, wherein said appendage-controlling wave receiver assembly is controlled by said wave transmitter assembly, and wherein:

said upper appendages are connected to said housing assembly by hinges, and said push-pull rods are connected to said upper appendages by pivots at positions distal to said hinges.

* * * * *